United States Patent [19]
Lilja et al.

[11] Patent Number: 5,182,087
[45] Date of Patent: Jan. 26, 1993

[54] METHOD FOR MIXING TWO LIQUIDS OR LIQUID AND SOLID MATERIAL TOGETHER, AND FOR SIMULTANEOUSLY SEPARATING ANOTHER LIQUID OR SOLID FROM THE LIQUID

[75] Inventors: Launo L. Lilja; Valto J. Mäkitalo; Stig-Erik Hultholm, all of Pori; Bror G. Nyman, Ulvila, all of Finland

[73] Assignee: Outokumpu Oy, Espoo, Finland

[21] Appl. No.: 675,437

[22] Filed: Mar. 26, 1991

[30] Foreign Application Priority Data

Apr. 4, 1990 [FI] Finland .................................. 901693

[51] Int. Cl.⁵ .............................................. B01F 3/00
[52] U.S. Cl. .................................... 422/228; 422/135; 422/224; 422/225; 422/229; 422/258; 422/259; 366/319; 366/320; 210/208
[58] Field of Search ............... 422/135, 228, 229, 258, 422/259, 224, 225; 210/208, 532.1, 634, 738; 366/320, 307, 319, 320, 323

[56] References Cited

U.S. PATENT DOCUMENTS

| | | | |
|---|---|---|---|
| 2,502,490 | 4/1950 | Sweet | 422/228 |
| 3,762,947 | 10/1973 | Ornstein et al. | 366/320 |
| 4,022,438 | 5/1977 | Shishido et al. | 366/310 |
| 4,472,063 | 9/1984 | Eickelmann | 366/320 |
| 4,628,391 | 12/1986 | Nyman et al. | 366/265 |
| 4,648,973 | 3/1987 | Hultholm et al. | 210/629 |
| 4,710,291 | 12/1987 | Condolios | 210/208 |
| 4,938,878 | 7/1990 | Hall | 210/532.1 |

Primary Examiner—Robert J. Warden
Assistant Examiner—Christoher Y. Kim
Attorney, Agent, or Firm—Brooks Haidt Haffner & Delahunty

[57] ABSTRACT

The invention relates to a method for maintaining a continuous mixing in a liquid throughout the transversal reactor space, and for simultaneously separating from the liquid either another liquid, a solid material or possibly gas. The invention also relates to an apparatus whereby the mixing is maintained and simultaneously another phase is separated from the liquid under agitation.

9 Claims, 2 Drawing Sheets

METHOD FOR MIXING TWO LIQUIDS OR LIQUID AND SOLID MATERIAL TOGETHER, AND FOR SIMULTANEOUSLY SEPARATING ANOTHER LIQUID OR SOLID FROM THE LIQUID

BACKGROUND OF THE INVENTION

1. Field of the Invention

The present invention relates to a method for maintaining a continuous mixing in a liquid throughout the transversal section of the whole reactor space, and for simultaneously separating either another liquid, solids or possibly gas from the liquid. The invention also relates to an apparatus for maintaining mixing and for simultaneously removing another phase from the liquid under agitation.

2. Description of the Related Art

For mixing, there are generally used various types of blade impellers, which are sufficient for many mixing purposes. However, when it is necessary to extend the mixing throughout the whole of the liquid volume, the number of stirrers suited for this purpose is fairly limited. The U.S. Pat. No. 4,648,973 describes an apparatus comprising two nested tubes. The liquid to be mixed flows downwards in the innermost tube, and this tube is provided with a blade stirrer. Gas is conducted to the liquid, into the innermost tube, via venturis, and this agitates the liquid. In the bottom part of the apparatus, the flowing direction of the liquid is reversed, and it starts flowing upwards in the outer tube, thereafter circulating back to the inner tube. In practice it has been proved that this apparatus creates a mixture extending throughout the liquid surface, but for the reactions taking place in connection with the mixing it is important that the said apparatus should be constructed fairly high, which sets certain limits to the use of the arrangement. Further, if the aim is to separate from liquid another liquid or some solid material, the above described apparatus is in practice difficult to apply to the said purpose.

A fairly good mixture extending throughout the liquid surface is also created with various helical impellers. Helical impellers are often used for mixing highly viscous liquids. The most popular application in these cases has been an arrangement where the diameter of the impeller is at least 0.9 times as long as the diameter of the reactor. This type of stirrer is described for instance in the U.S. Pat. No. 4,022,438, which specifies a stirring apparatus formed of two helical ribbon type blades. The impellers can also be composed of a single pipe or blade. Because the impeller already covers nearly all of the transversal surface of the reactor, baffles are not provided in such reactors. Generally the width of the blade is 10% of the diameter of the helical impeller. Normally the helical impellers are arranged to rotate so that the created flow pattern proceeds down at the rims and up in the middle.

SUMMARY OF THE INVENTION

According to the method of the present invention, liquid is mixed in the reaction vessel, and simultaneously there is separated either another liquid or solids, which are discharged through the bottom part of the reactor space. The reactor space is designed for this purpose, as well as the helical impeller used in the agitation. The reactor space is divided into three separate zones, the topmost whereof is the cylindrical reaction zone with intensive agitation. Therebelow is the conical settling zone, where the droplets of the second liquid, or the solid particles, coalesce and start descending further. The lowest is the collection zone, where the separated drops descend.

The invention also relates to a corresponding apparatus which mainly comprises a reactor designed for the separation and settling of another liquid or solids, which reactor is cylindrical at the top and conical at the bottom and ends up to the collecting zone, of baffles provided in the reactor and the helical impeller proper. The diameter of the collecting zone is essentially smaller than that of the cylindrical part of the reactor. The shape of the collecting zone is most advantageously cylindrical, but it can also be of some other shape. It is essential with respect to the helical impeller that its diameter is in the region 0.50–0.75 times the reactor diameter. At the bottom part of the helical impeller there is provided a cone which prevents the material descended down to the collecting zone of the reactor from rising back to the stirred circulation. Owing to the protective cone provided in the impeller and baffles, the flow pattern of the liquid to be mixed in the reactor becomes descending in the middle and ascending at the reactor rims, so that the created flow pattern facilitates the settling of the secondary liquid drops separated from the liquid, or of the solid particles. Thus the liquid flow created in the reactor is ascending in the region which is more than 0.7 times the radius of the cylindrical section of the reactor, and descending inside this region. The essential novel features of the invention are apparent from the appended patent claims.

In processes to which the present invention is particularly well suited, it is important that the secondary liquid resident as small droplets in the solution is first made to coalesce into larger drops, which then are settled to the bottom part of the reactor. Another important condition for the reaction is that the already created drops are kept in the collecting zone and are not taken back to the stirred liquid circulation. One such process is for instance the liquefaction of mercury from an aqueous solution.

The coalescence of small droplets is based on a collision probability, which again is based on the growth of speed differences while the mixing is intensified. An intensified mixing is created by means of the spiral structure of the invention and by the baffles arranged in the reactor, whereby the mixing is extended throughout the whole reactor space. When comparing the apparatus of the invention for example to a prior art impeller with the same dimensions, it is found that the latter must be made so big (0.9 times the reactor diameter) that the balancing thereof becomes downright impossible, particularly when the reactor size grows to the class of 8–10 m or more in diameter.

The holding of the drops in the collection zone, which drops have coalesced in the reaction space and descended from the settling zone to the collecting zone, is taken into account in an essential element of the present invention, i.e. in the downwards widening protective cone attached to the bottom part of the impeller. The purpose of the protective cone is to prevent the vortex flows created in the reaction space from entering the collection zone and sucking up drops. Such suction flows easily create above the collection zone a field preventing the settling of drops, and also absorb the already settled drops back to the reaction space. In addition to this, the protective zone, when correctly designed, guides the flow in the bottompart of the reactor. The diameter of the collection zone is advantageously 0.8–1.2 times as long as the diameter of the bottom part of the protective cone.

The employed impeller is advantageously a helical impeller formed of two round tubular coils, the bottom part whereof is provided with a protective cone. The pitch of the coils is mainly standard pitch, and the coils start from the opposite sides of the axis, thus balancing the stirrer. The coils are attached to the axis by means of supports, which at the same time form part of the mixing mechanism, and thus their location and number is an essential factor when defining the measures of the stirrer. Among the advantages of stirrers made of round tube as compared to those made of blade iron, let us point out the following: —A helical impeller made of round tube is easy to produce, it is solid and firm. —A round tube always shears the liquid to be mixed in the same fashion, so that the resistance remains the same throughout the space; while using a blade iron, the shearing depends on the angle of attack, and because the resistance then varies, it may cause imbalance in the operation of the stirrer. —When necessary, gas or liquid can be fed through the tube into the immediate vicinity of the tube, either because of the reactions or for instance for lubrication. The advantage here is that the supplied additive thus enters all regions, and particularly the area of intensive agitation. —A general rule for defining the measures is that the width of the blade iron used in the mixing is 10% of the diameter of the stirrer. In experiments that were carried out it was now observed that while using a tubular coil, the same mixing result is achieved when the diameter of the tubular coil is about 3% of the diameter of the impeller. Obviously this also affects the power consumption.

In addition to the separation of mercury drops, the method and apparatus of the present invention is also suited for other corresponding separation tasks of the process industry, in cases where the aim is to mix a liquid phase in a controlled manner and simultaneously to separate therefrom another, existing or creating phase, which can be another liquid phase, a solid phase, or both. Normally the question is of a measure for improving and homogenizing quality, which can be appropriately performed according to the method of the invention. According to the said method, it is possible to mix large volumes in a controlled fashion, and therefore the apparatus of the invention can be used in storage tanks. The rotation speed of the streamlined impeller can be adjusted within a range which creates a slow vertical circulation throughout the whole tank, excluding the collection zone of the reactor, located below the protective cone provided in the bottom part of the impeller. The mixing conditions must be chosen so that the material flow passing through the storage tank is subjected to a uniform treatment, and as a consequence the drops and/or solid particles separated to a distinguished phase are collected to the collection zone of the tank. The said treatment may include a supply of chemicals which further enhances the desired separation. Homogeneous mixing conditions have a favourable effect to the formation of the phase to be separated, both as regards possible chemical reactions and as regards mechanical drop or particle collisions.

The impeller of the invention, provided with a protective cone, creates a flow proceeding downwards in the middle, which flow, due to the effect of the protective cone, turns towards the rims near the bottom. The change of direction helps a drop or solid phase heavier than the solution to be separated from the said stirred circulation. Thus the separated material is gradually collected to the collection zone below the protective cone, wherefrom it is discharged when necessary.

The separation of water from crude oil and the destabilization of other corresponding water-in-oil emulsions is one example of the possible applications of the present invention. According to the technique of the invention, oil is put in a slow vertical circulation in the storage tank. The water drops coalesce to a separable size, either simply owing to collisions between the drops, or also owing to the addition of destabilization chemicals which destabilize emulsions. The water separated from the oil can be discharged from the tank through a conduit provided in the immediate vicinity of the protective cone.

Metallurgical processes include cases where the technique of the invention can be utilized in the cleaning of solutions to be pumped through a storage tank. One example are metal solutions created by means of acid or alkali leaching, which can be cleaned of impurities such as iron, aluminium, chromium, antimony, phosphorus, arsenic and silicon, by employing prolonged pH-regulated precipitation in the apparatus of the invention. Generally the obtained cleaning results are the better the longer the treatment period, and the larger the amount of precipitating material in the tank, and therefore the technique of the present invention is well suited to the said purpose. Large tanks are provided with the baffles and stirrers of the invention. When the mixer also is provided with a protective zone, the solid content in the bottom part of the tank is increased, which again intensifies the cleaning and crystallization process itself.

The apparatus of the invention has a solid structure, and therefore it is well suited to the mixing of thick sludges and thixotropic mixtures, too. It is also pointed out that the mixing method of the present invention increases the temperature of the stored sludge less than other types of mixing. This factor is of decisive importance for instance in insulated pigment sludge storage tanks.

BRIEF DESCRIPTION OF THE DRAWING

The invention is further described below with reference to the appended drawings, where.

DESCRIPTION OF PREFERRED EMBODIMENTS

Figure 1:
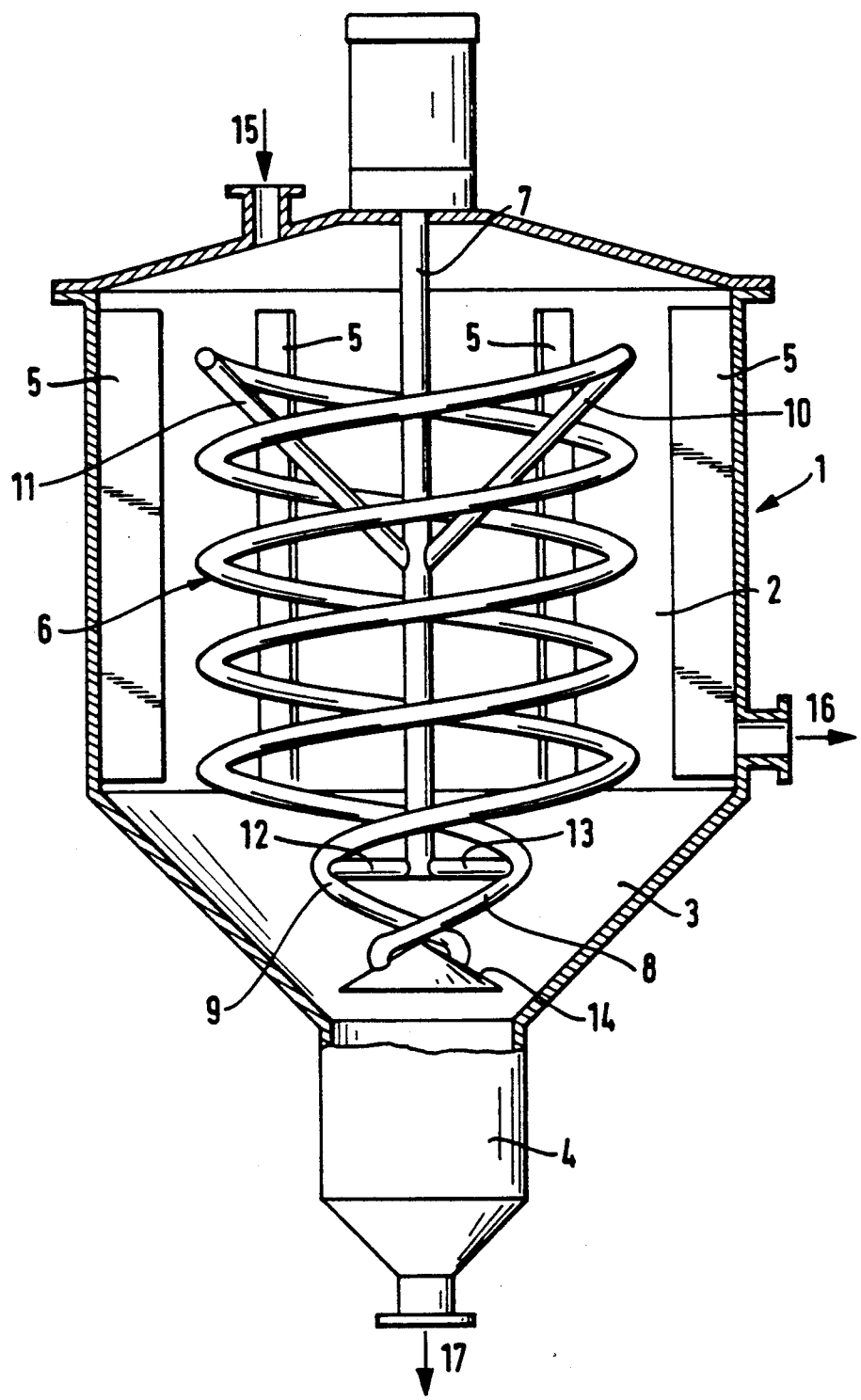
FIG. 1 is an illustration of the apparatus of the invention, seen in vertical cross-section.

As is seen in FIG. 1, the reactor 1 comprises in the top part a cylindrical reaction zone 2, then a conical settling zone 3 and a collecting zone 4. Around the rims of the reactor, there are provided baffles 5. The baffles are of normal structure and prevent horizontal rotatory flows and the creation of vortex. By employing baffles, it is possible to maintain even in large reactors an adequate agitation throughout the transversal space of the reactor, although diameter used in normal helical impellers. The helical impeller 6 is advantageously formed of at least two tubular coils 8 and 9 attached around the axis 7, and of the upper support rods 10 and 11 and lower support rods 12 and 13 of the said coils. The diameter of the impeller becomes advantageously smaller towards the conical part of the reactor, and the bottom part of the impeller is provided with an downwardly widening protective cone 14. The mixture of the liquids under treatment, or of the liquid and solid material, is fed into the top part of the reactor, in the direction of arrow 15, and the liquid that has a larger volume, for instance water in the mixture of water and mercury, is discharged, in the direction of arrow 16, generally through the bottom part of the reaction zone. The liquid separated from the mixture, such as mercury, or the solids that were present in the mixture, are periodically discharged from the bottom part of the collecting zone in the direction of arrow 17.

The spirals of the impeller advantageously rotate about two times around the axis, and their direction of pitch is opposite to the direction of rotation of the impeller. The support rods of the spiral are generally made of the same material as the spirals. The support rods are essential for the operation of the stirrer, because they cause radial mixing. According to the drawing, the lowest support rods are placed horizontally at the ends of the spirals. The supports provided in the middle of the impeller, not shown in the drawing, meet the axis at an angle of 60°. The topmost supports descend towards the axis, so that they proceed, at an angle of 45°, from the top end of the spirals towards the axis. When arranged like this, the topmost supports do not break the surface of the liquid and thus do not lead to any mixing of air to the liquid.

Figure 2:
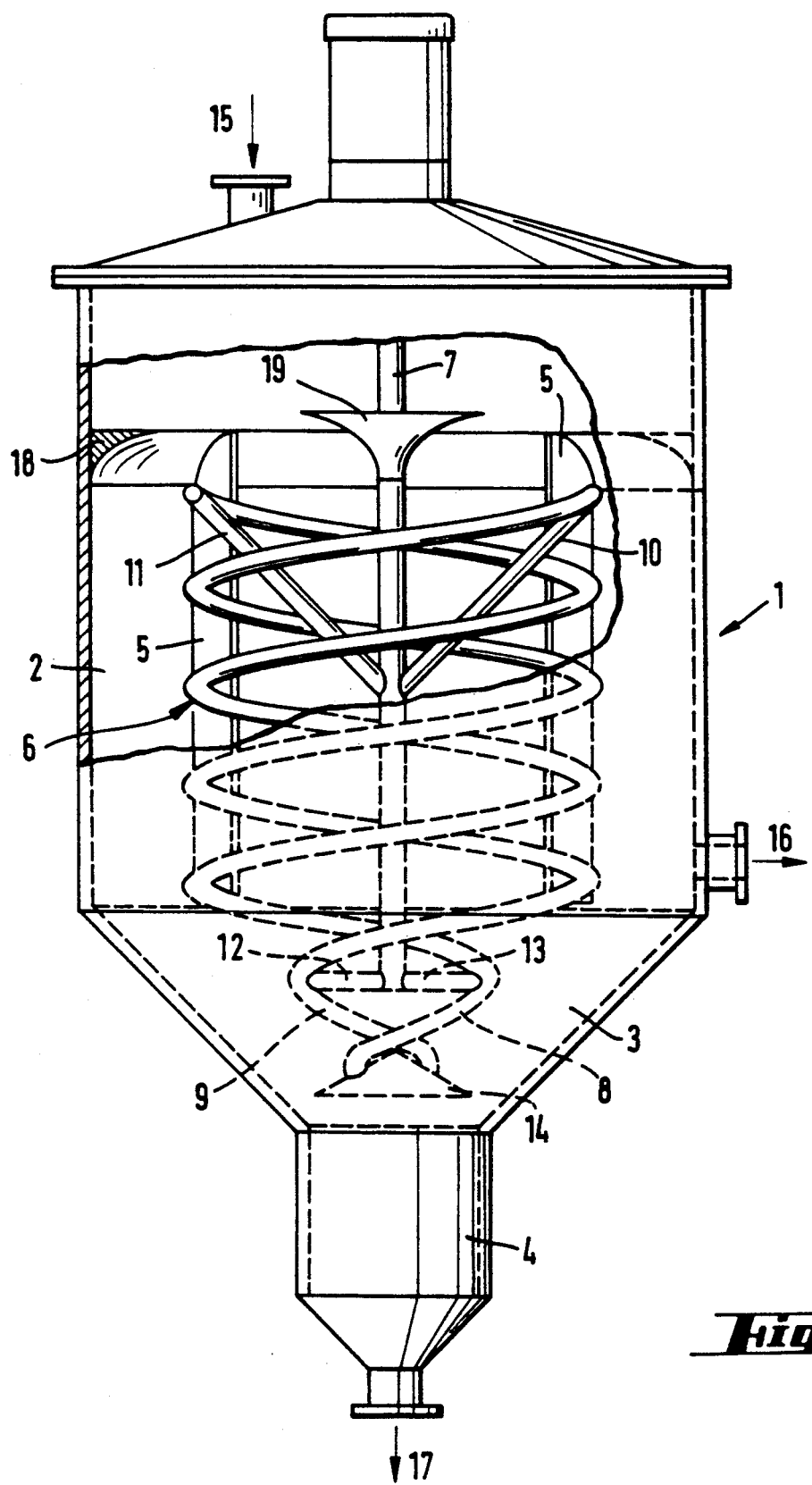
FIG. 2 is an illustration of another apparatus of the invention, seen in a partial cross-section.

The mixing technique of the invention is also suited to be used in biotechnical applications. Then the reactor may be formed of several mixing zones placed on top of each other. Different micro-organism cultures can be maintained in the separate mixing zones, by adjusting the conditions of growth to be suitable for each organism. In this case it is also possible to use the embodiment of FIG. 2, where the reactor is provided, in addition to the described baffles 5 and the helical impeller 6, with a profiled ring 18 placed in the rim area of the top part of the reactor, and with a flow reverser 19 placed in the top part of the impeller, around the axis thereof. By means of the profiled ring and the flow reverser, the flow is reversed at the rims to proceed towards the middle, and the creation of vortex is further prevented. These also prevent air from getting mixed into the liquid. The said devices can also be used for separating the different zones from each other. Biotechnical reactors include the removal of gas, which can be carried out according to the known technique.

The invention is further described with reference to the following examples:

EXAMPLE 1

Mercury was removed from roast gases by employing sulphatization with a strong sulphuric acid solution. As an intermediate product there was obtained a mercury-bearing precipitate, wherefrom the mercury can be vapourized by heating after lime neutralization. The resulting gas is liquefied by means of cooling, so that there is created a mixture of water and liquid mercury, which also contains solid compounds. These compounds are for instance mercury selenides on the surface of mercury drops, and they prevent the drops from coalescing, so that the liquefaction of mercury remains incomplete.

The coalescence of mercury drops was attempted to be enhanced by using a Rushton-type stirrer in the liquefier, the volume whereof was 3 $m^3$. Part of the mercury remained permanently unliquefied, although it was attempted to release the mercury from selenides by means of various oxidizers.

The Rushton turbine was replaced by the apparatus of the present invention, where the reactor comprised a cylindrical reaction zone, a conical bottom part and a collection zone, and baffles were provided at the rims of the reactor. The stirrer was the above described helical impeller, the bottom part whereof was provided with a protective cone. Due to the influence of the protective cone, the flow created by the impeller and proceeding downwards in the middle of the reactor, was then directed to the sides and consequently towards the rims, which facilitated the separation of mercury. The already separated mercury was located in a dead spot and was not mixed back to the circulating flow. The diameter of the stirrer was 0.7 times the diameter of the reactor, which was 1500 mm. By using the apparatus of the invention, the complete liquefaction of the mercury succeeded, when the same chemical oxidation was applied as while mixing with the Rushton turbine.

EXAMPLE 2

The apparatus of the invention was compared, in laboratory scale, to a Rushton-type turbine. The vessel used in the experiment had a diameter of 194 mm and a height of 194 mm. The vessel was filled with 5.0 l of an alifatic hydrocarbon, type Shellsol D 70, and 0.5 l water, which contained 1.0 g $Na_2SO_4$.

The stirrer installed in the vessel was a Rushton-type turbine with straight blades and the diameter of 80 mm. The turbine was installed in the middle of the vessel and rotated for 10 minutes at the speed of 700 rpm. The result was a hydrocarbon phase blurred with small water droplets, water content 1800 ppm.

The Rushton turbine was replaced with the helical impeller of the invention, with a diameter of 137 mm and pitch 65.5 mm. The support rods were arranged at an angle of 60° with respect to the axis, and they were stepped 225° with respect to each other. The support rods and the double coil were made of a tube with the diameter of 8.0 mm. The diameter of the protective cone was 67 mm. The helical impeller was rotated for 60 min with the speed of 180 rpm. During the said agitation, the blurred appearance of the hydrocarbon phase was remarkably cleared. According to performed measurements, the water content of the hydrocarbon phase was now only 530 ppm.

We claim:

1. A method for maintaining continuous mixing in a liquid throughout a reactor space and for simultaneously separating from said liquid either a second liquid or solid particles comprising: providing a reactor having three vertically superposed zones; filling said reactor with liquid and with a second liquid or a liquid and solid particles, mixing said liquid and said second liquid or said liquid and solid particles in a cylindrical reaction zone, coalescing and settling droplets of said second liquid or said solid particles in a conical settling zone below said reaction zone, and collecting said droplets or solid particles in a collecting zone below said settling zone, homogeneously mixing said liquid throughout said reaction and settling zones by creating a vertical circulation in said reactor by means of a helical impeller and baffles at rims of the reactor for causing the liquid to circulate downwards in a middle portion of the reactor and to circulate upwards near said rims of the reactor, and preventing the return of liquid or solid particles from the collecting zone into said circulation by providing a protective conical deflector at a bottom end of said helical impeller.

2. The method of claim 1 further comprising causing a radial circulation in the liquid.

3. The method of claim 1 wherein said liquid circulates downwards in a middle portion of said reactor which is concentric with said cylindrical reaction zone and has a diameter of at least 0.7 times the diameter of said cylindrical reaction zone and said liquid circulates upward around and outside of said middle portion of the reactor.

4. An apparatus for maintaining continuous mixing of a liquid in a reactor space, and for simultaneously separating a second liquid or solid particles from the liquid, comprising: a reactor having rim walls defining a cylindrical zone, a conical zone below said cylindrical zone and a collection zone below said conical zone having a diameter which is smaller than the diameter of said cylindrical zone, said zones all having a common vertical axis; a helical impeller comprising at least two helical tubes mounted for rotation about said vertical axis on a central axial shaft, said helical impeller having a diameter which decreases in the collection zone; baffles on said rim walls; and a protective conical deflector at a bottom end of said central axial shaft.

5. The apparatus of claim 3, wherein the diameter of the helical impeller is 0.5-0.75 times the diameter of the reactor.

6. The apparatus of claim 4, wherein the protective cone is narrowed upwards.

7. The apparatus of claim 4, wherein the helical impeller is formed of two tubular coils attached around the central axial shaft opposite to each other, which coils are fastened to the axis by intermediation of support rods, and of said conical deflector.

8. The apparatus of claim 4, 6 or 7, wherein topmost support rods of the impeller descend towards the axis.

9. The apparatus of claim 4, wherein the diameter of the collection zone is 0.9-1.2 times the diameter of the protective conical deflector.

* * * * *

UNITED STATES PATENT AND TRADEMARK OFFICE
CERTIFICATE OF CORRECTION

PATENT NO. : 5,182,087
DATED : January 26, 1993
INVENTOR(S) : Launo L. Lilja et al It is certified that error appears in the above-identified patent and that said Letters Patent is hereby corrected as shown below:

Column 3, line 2: "bottompart" should read: --bottom part--.

Column 4, line 64: "although diameter used" should read:
    --although the diameter of the impeller is
      essentially smaller than the diameter used--.

Claim 5. - Column 8, line 6: "The apparatus of claim 3"
    should read: --The apparatus of claim 4--.

Column 8, line 15: "fastened to the axis by" should read:
    --fastened to the shaft by--.

Signed and Sealed this

Twenty-sixth Day of October, 1993

Attest:

BRUCE LEHMAN

Attesting Officer

Commissioner of Patents and Trademarks